ent and operating effect which I regard as important to practise the same, what I claim and desire to secure by Letters Patent is—

UNITED STATES PATENT OFFICE.

SADAKICHI SATOW, OF SENDAI, JAPAN.

FOOD OBTAINED FROM FISH AND PROCESS OF MAKING THE SAME.

1,370,049.　　　　Specification of Letters Patent.　　Patented Mar. 1, 1921.

No Drawing.　　Application filed May 5, 1917. Serial No. 166,622.

*To all whom it may concern:*

Be it known that I, SADAKICHI SATOW, a subject of the Emperor of Japan, residing at Sendai, Japan, have made a certain new and useful Invention in Food Obtained from Fish and Processes of Making the Same, of which the following is a specification.

In the manufacture of fish oil as ordinarily carried out, it is common practice to boil the fish, in the operation of separating the oil therefrom, and after the oil is recovered the residue is thrown away or sold and used as a soil fertilizer.

It is among the special purposes of my present invention to utilize this residue in the manufacture of a cheap and nutritious human food product.

In carrying out my invention, I take the cooked residue from the manufacture of fish oil, and crush or grind the same into a paste, which is then dried, under high vacuum and low temperature, say 29 inches and from 40° F. to 50° F., and the dried mass is crushed or ground into a powder. This powder contains the cooked fish flesh, the albumen of which has been coagulated by the heat employed in the cooking or boiling operation. It also contains the bones, as well as the scales, in case the latter have not been removed before the cooking operation, all of which have been crushed or ground to a powder in producing the paste.

The powder obtained as above described keeps indefinitely without deterioration, alteration, or putrefaction.

For use as a food product it is mixed with a sufficient quantity of water to form a paste which is then cooked in hot or boiling water, thereby producing a nutritious, palatable food product having the natural taste and flavor of fresh fish.

Instead of using the powder directly as a food product, it may be extracted with an albumen solvent, such as alkali, ammonia, and salts which react alkaline in solution. The extract may be purified by filtration, or otherwise, and then evaporated or otherwise reduced to dryness under high vacuum and low temperature and crushed or ground into a powder. In case an alkline reagent is employed as a solvent for the albumen it is of course necessary to neutralize the extract. This may be accomplished in any well known manner.

The albumen obtained in any of the ways above described is transformed into soluble form in any suitable manner, for example with a proteolytic enzyme, such as pepsin, trypsin, or other albumen digesting ferment. The tranformed mass is then treated with water to extract the soluble matter contained therein. This extract is then purified by filtration, or otherwise, and the purified extract is evaporated under high vacuum and low temperature. This evaporated mass, which, if desired, may be crushed into a powder, and containing predigested albumen as well as proteolytic enzyme, constitutes a highly nutritious and digestible food product.

By employing a high vacuum and low temperature in carrying out my invention I avoid deterioration or putrefaction of the coagulated albumen which would result if ordinary atmospheric or higher pressures and temperatures are employed. The heat employed in initially cooking or boiling the raw fish merely coagulates the albumen and does not decompose or putrefy the same. If, however, high temperature is employed with ordinary atmospheric or high pressures in drying the albumen, or in evaporating the mass containing the albumen, deterioration and putrefaction of the albumen will take place. This would be beneficial and useful for a soil fertilizer but fatal for a human food product. Therefore, to avoid this serious difficulty, in carrying out my invention, I employ high vacuum and low temperature in effecting the drying or evaporation of the mass containing the coagulated albumen. This I regard as a very important and valuable feature of my invention.

This method of treatment, in accordance with the principle of my invention, is exceedingly valuable and important in the treatment of the residue of fish oil manufacture, in that it enables such residue to be employed in the manufacture of an excellent cheap human food product from waste material now used principally as a soil fertilizer. In the manufacture of fish oil, as ordinarily carried out the fish is boiled in the operation of separating the oil, and after the oil is recovered, the residue is dried at ordinary atmospheric pressure and ordinary temperature and sold as a fertilizer. It is this residue that I utilize, in accordance with my invention, in the manufacture of a useful human food product.

Having now set forth the objects and nature of my invention, and the manner of carrying the same into effect, what I claim as new and useful, and of my own invention, and desire to secure by Letters Patent is:—

1. In the manufacture of a human food product from the cooked residue from fish oil manufacture, the process which consists in crushing or grinding such residue into a paste, and then drying such paste under high vacuum and at a temperature below 50° F., and then crushing or grinding the dried mass into a powder.

2. In the manufacture of a human food product from the cooked residue from fish oil manufacture, the process which consists in crushing or grinding such residue into a paste, and then drying such paste under high vacuum and at a temperature below 50° F., then crushing or grinding the dried mass into a powder, and extracting the powder with an albumen solvent.

3. In the manufacture of a human food product from the cooked residue from fish oil manufacture, the process which consists in crushing or grinding such residue into a paste, and then drying such paste under high vacuum and at a temperature below 50° F., then crushing or grinding the dried mass into a powder, and then transforming the albumen content of the mass into soluble form with a proteolytic enzyme.

4. In the manufacture of a human food product from the cooked residue from fish oil manufacture, the process which consists in crushing or grinding such residue into a paste, and then drying such paste under high vacuum and at a temperature below 50° F., then crushing or grinding the dried mass into a powder, and then transforming the albumen content of the mass into soluble form with a proteolytic enzyme, then extracting with water the soluble albumen, and evaporating the extract under high vacuum and low temperature, and finally crushing or grinding the evaporated mass into a powder.

In testimony whereof I have hereunto set my hand on this 30th day of April, A. D. 1917.

SADAKICHI SATOW.